US011006426B2

(12) United States Patent
Martin et al.

(10) Patent No.: US 11,006,426 B2
(45) Date of Patent: *May 11, 2021

(54) TERMINAL, DEVICE, BASE STATION, SYSTEM AND METHODS FOR SPEED ESTIMATION TECHNIQUES

(71) Applicant: Sony Corporation, Tokyo (JP)

(72) Inventors: Brian Alexander Martin, Basingstoke (GB); Yuxin Wei, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/727,917

(22) Filed: Dec. 27, 2019

(65) Prior Publication Data

US 2020/0137746 A1    Apr. 30, 2020

Related U.S. Application Data

(63) Continuation of application No. 15/769,935, filed as application No. PCT/EP2016/076523 on Nov. 3, 2016, now Pat. No. 10,536,947.

(30) Foreign Application Priority Data

Nov. 5, 2015   (EP) .................................... 15193158

(51) Int. Cl.
*H04W 72/04* (2009.01)
*H04W 4/70* (2018.01)
(Continued)

(52) U.S. Cl.
CPC .......... *H04W 72/048* (2013.01); *H04W 4/02* (2013.01); *H04W 4/027* (2013.01); *H04W 4/40* (2018.02); *H04W 4/70* (2018.02); *H04W 72/04* (2013.01)

(58) Field of Classification Search
CPC ....... H04W 4/027; H04W 4/046; H04W 4/70; H04W 4/40; H04W 72/048; H04W 72/04;
(Continued)

(56) References Cited

U.S. PATENT DOCUMENTS

2010/0081446 A1* 4/2010 Ushiki .............. H04W 56/0015
                                                          455/450
2011/0263244 A1* 10/2011 Kobayashi ............ H04W 24/08
                                                          455/423

(Continued)

FOREIGN PATENT DOCUMENTS

EP          2 903 366 A1     8/2015
WO       2008/149420 A1    12/2008
(Continued)

OTHER PUBLICATIONS

International Search Report dated Feb. 10, 2017, in PCT/EP2016/076523 filed Nov. 3, 2016.
(Continued)

*Primary Examiner* — Mewale A Ambaye
(74) *Attorney, Agent, or Firm* — Xsensus LLP

(57) ABSTRACT

A first terminal device for use with a wireless telecommunications system, the first terminal device including a transceiver configured to to exchange signalling with a second terminal device using communication resources from within one of a plurality of sets of communication resources, each set of communication resources being associated with a different respective range of possible speeds of the first terminal device, the association being determined in accordance with a predetermined characteristic of the sets of communication resources; and a controller operable to control the transceiver to exchange signalling with the second terminal device using communication resources from within the set of communication resources associated with the range of possible speeds of the first terminal device within
(Continued)

which a determined speed of the first terminal device is found.

17 Claims, 6 Drawing Sheets

(51) Int. Cl.
*H04W 4/02* (2018.01)
*H04W 4/40* (2018.01)

(58) Field of Classification Search
CPC ....... H04W 4/02; H04W 24/00; H04W 24/10; H04W 72/085; H04W 72/044
See application file for complete search history.

(56) References Cited

U.S. PATENT DOCUMENTS

| | | | | |
|---|---|---|---|---|
| 2012/0129545 | A1* | 5/2012 | Hodis | G01S 19/48 455/456.1 |
| 2012/0252432 | A1* | 10/2012 | Henttonen | H04W 24/10 455/422.1 |
| 2014/0192781 | A1 | 7/2014 | Teyeb et al. | |
| 2015/0223217 | A1* | 8/2015 | Chen | H04W 72/044 370/329 |
| 2016/0198292 | A1 | 7/2016 | Sponza et al. | |
| 2016/0205665 | A1* | 7/2016 | Fukuta | H04W 72/02 455/454 |
| 2016/0278121 | A1 | 9/2016 | Agiwal et al. | |
| 2017/0078063 | A1 | 3/2017 | Gerszberg | |
| 2018/0220349 | A1* | 8/2018 | Watanabe | H04W 36/0088 |

FOREIGN PATENT DOCUMENTS

| | | |
|---|---|---|
| WO | WO 2015/029953 A1 | 3/2015 |
| WO | WO 2015/065130 A1 | 5/2015 |

OTHER PUBLICATIONS

3GPP TSG RAN Meeting #68, RP-151109, LG Electronics, CATT, Vodafone, Huawei, "New SI proposal: Feasibility Study on LTE-based V2X Services", Agenda Item: 13.1.1, (2015), 7 pages.

3GPP TSG RAN WG2 Meeting #91 bis, R2-154896, Intel Corporation, "Initial consideration on V2V", Agenda Item: 7.11, (2015), 3 pages.

3GPP TSG RAN WG1 Meeting #82bis, R1-155624, Sony Corporation, "PC5 enhancements on resource allocation for V2X Services", Agenda Item: 7.2.8.2.1, (2015), 2 pages.

Holma, H. et al., "LTE for UMTS OFDMA and SC-FDMA Based Radio Access", Wiley, (2009), 8 pages.

* cited by examiner

TERMINAL, DEVICE, BASE STATION, SYSTEM AND METHODS FOR SPEED ESTIMATION TECHNIQUES

CROSS-REFERENCE TO RELATED APPLICATIONS

The present application is a continuation of U.S. application Ser. No. 15/769,935, filed Apr. 20, 2018, which is based on PCT filing PCT/EP2016/076523, filed Nov. 3, 2016, which claims priority to EP 15193158.1, filed Nov. 5, 2015, the entire contents of each are incorporated herein by reference.

BACKGROUND

Field of the Disclosure

The present disclosure relates to a terminal device, base station, system and methods.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

The automotive industry has been working for several years on solutions to enable communication with and between vehicles so as to help improve traffic flow and safety. These techniques range from automatic tolling technologies to collision prevention mechanisms, and are generally known as Intelligent Transport Systems (ITS). Currently, the main radio technology that is being considered in standards projects is a WLAN derivative 802.11p, which would be used for broadcasting ITS information to vehicles. This constitutes a so-called Dedicated Short Range Communication (DSRC) system that is deployed at 5.9 GHz ITS band in Europe (there may be different ITS bands in use in other regions, e.g. 700 MHz in Japan).

The effective range of DSRC systems is a few hundred meters and the services are broadcast oriented (emergency vehicle notices, for example). It is considered that mobile telecommunications networks, such as Long Term Evolution (LTE) on International Mobile Telecommunications (IMT) bands, could fulfil at least some of the ITS needs, and also provide wider and cheaper coverage. In particular, where the existing cellular network already covers roadways the capital expenditure costs may be a fraction of what is needed for setting up a new DSRC-based ITS network.

LTE is understood to play an increasingly important role in the connected vehicle ecosystem. LTE based solutions may in particular bring improvements in spectral efficiency, effective communications range, throughput, error resiliency and Quality of Service. It is noted that LTE networks are finding new areas of deployment with each new 3GPP Release. Release 12 introduced Public Safety aspects on device-to-device (D2D) communications, and Release 13 continues to develop the D2D concepts further. In Release 14 stage 3GPP starts to discuss vehicular communications, effectively considering whether and how LTE networks could support Intelligent Transport Systems (ITS).

Connected vehicle systems are called V2X, which consists of V2V (vehicle-to-vehicle), V2P (vehicle-to-pedestrian) and V2I (vehicle-to-infrastructure). Infrastructure in this case may be the roadside ITS related infrastructure or backbone systems in Internet or mobile networks. Some examples or services in connected car environment are Cooperative Awareness Message (CAM) and Decentralised Environmental Notification (DEN). These constitute applications such as allowing emergency vehicles to broadcast their presence and allowing roadside infrastructure to broadcast speed limit information to vehicles. It is envisaged that LTE will work with 802.11p in order to provide such services, and that both radio technologies will likely find applications in the connected vehicle ecosystem.

A Study Item (SI) has been agreed in 3GPP on V2X communication (Vehicle communication) to study possible enhancement to LTE to support V2X communication. The study item is RP-151109 "New SI proposal: Feasibility Study on LTE-based V2X Services" from LG Electronics, CATT, Vodafone and Huawei (3GPP TSG RAN Meeting #68 Malmo, Sweden, Jun. 15-18, 2015) [1].

It has been proposed that V2X communications may be implemented using network nodes (such as dedicated Road Side Units (RSUs) and/or cellular base stations such as enhanced Node Bs (eNBs)) which communicate with the user equipment (UE) of vehicles and which assign certain configurations to the vehicle UEs. Such configurations include communication resources (in particular, radio resources) for use by the vehicle UEs in V2X communications. In particular, such network nodes may allocate D2D radio resources for use in V2X communications.

It is known that the speed of a UE has implications on various aspects of its operation, for example mobility and measurements and the reliability of communication. Due to the wide range of speeds considered for vehicular communication it is likely that the speed of the vehicle needs to be taken into account when providing configuration(s) to the devices. For example, mobility related measurement events provide parameters which are scaled according to the UE state. The time-to-trigger for measurement events can be extended at higher speeds to avoid frequent handovers (and risk of handover failures) for example—this is a particular problem when there are small cells deployed (which is likely to be the case with RSUs because their small cell size adds to the problem, particularly at high speeds).

In addition, it is also known that the conventional speed estimation techniques in 3GPP systems are unreliable. This provides an extra challenge when trying to design a reliable and efficient system for vehicular communications. The conventional speed estimation counts the number of cell changes, and based on this count the UE (or network NW) determines the mobility state to be low, medium or high. It has been acknowledged during earlier studies on heterogeneous network that such speed estimation techniques can be unreliable.

SUMMARY

In a first aspect, the present technique provides a first terminal device for use with a wireless telecommunications system, the first terminal device comprising: a transceiver operable to exchange signalling with a second terminal device using communication resources from within one of a plurality of sets of communication resources, each set of communication resources being associated with a different respective range of possible speeds of the first terminal device, the association being determined in accordance with a predetermined characteristic of the sets of communication resources; and a controller operable to control the transceiver to exchange signalling with the second terminal device using communication resources from within the set of communication resources associated with the range of possible speeds of the first terminal device within which a determined speed of the first terminal device is found.

In an embodiment, the transceiver is operable to receive signalling from infrastructure equipment identifying communication resources for use by the first terminal device in exchanging signalling with the second terminal device, the communication resources identified by the signalling received from the infrastructure equipment being selected by the infrastructure equipment from one or more of the sets of communication resources.

In an embodiment, the signalling received from the infrastructure equipment identifies the communication resources of each of the sets of communication resources, and the controller is operable to: determine the speed of the first terminal device; select the set of communication resources associated with the range of possible speeds of the first terminal device within which the determined speed of the first terminal device is found; and control the transceiver to exchange signalling with the second terminal device using communication resources from the selected set.

In an embodiment, the controller is operable to: determine the speed of the first terminal device; control the transceiver to transmit signalling to the infrastructure equipment identifying the determined speed; receive the signalling from the infrastructure equipment identifying communication resources for use by the first terminal device in exchanging signalling with the second terminal device, the identified communication resources being communication resources from the set of communication resources associated with the range of possible speeds of the first terminal device within which the determined speed of the first terminal device is found; and control the transceiver to exchange signalling with the second terminal device using a portion of the identified communication resources.

In an embodiment, the signalling received from the infrastructure equipment identifies the communication resources of each of a portion of the sets of communication resources, each set in the portion of sets being associated with a different respective range of possible speeds of the first terminal device within a predetermined speed constraint, and the controller is operable to: determine the speed of the first terminal device; determine whether the speed of the first terminal device is within the predetermined speed constraint; if it is determined that the speed of the first terminal device is within the predetermined speed constraint, select the set of communication resources identified in the signalling received from the infrastructure equipment which is associated with the range of possible speeds of the first terminal device within which the determined speed of the first terminal device is found, and control the transceiver to exchange signalling with the second terminal device using communication resources from the selected set; and if it is determined that the speed of the first terminal device is outside of the predetermined speed constraint, control the transceiver to transmit signalling to the infrastructure equipment identifying the speed of the first terminal device, control the transceiver to receive new signalling from the infrastructure equipment newly identifying communication resources for use by the first terminal device in exchanging signalling with the second terminal device, the newly identified communication resources being communication resources from the set of communication resources associated with the range of possible speeds of the first terminal device within which the determined speed of the first terminal device is found, and control the transceiver to exchange signalling with the second terminal device using a portion of the newly identified communication resources.

In an embodiment, the predetermined speed constraint is that each possible speed of the first terminal device within the range of possible speeds associated with each set of communication resources in the portion of sets of communication resources is less than a predetermined speed.

In an embodiment, the predetermined speed constraint is that each possible speed of the first terminal device within the range of possible speeds associated with each set of communication resources in the portion of sets of communication resources is greater than a predetermined speed.

In an embodiment, the predetermined characteristic in accordance with which each set of communication resources is associated with a different respective range of possible speeds of the first terminal device is a cell coverage area over which each set of communication resources is utilised, wherein a set of communication resources utilised over a larger coverage area is associated with a higher range of possible speeds of the first terminal device and a set of communication resources utilised over a smaller coverage area is associated with a lower range of possible speeds of the first terminal device.

In an embodiment, the controller is operable to receive an input from external equipment in order to determine the speed of the first terminal device.

In an embodiment, the transceiver is operable to exchange signalling with the second terminal device using communication resources from within one or more further sets of communication resources, each further set of communication resources being associated with a different event priority level detectable by the first terminal device, the event priority level indicating a level of severity of an event detectable by the first terminal device; and the controller is operable to: determine whether an event has occurred; and when it is determined that an event has occurred, determine the event priority level of the event, and control the transceiver to exchange signalling with the second terminal device using communication resources from within the further set of communication resources associated with the determined event priority level.

In a second aspect, the present technique provides Infrastructure equipment for use with a wireless telecommunications system, the infrastructure equipment comprising: a transceiver; and a controller; wherein the controller is operable to control the transceiver to transmit signalling to a first terminal device identifying communication resources for use by the first terminal device in exchanging signalling with a second terminal device, wherein the communication resources identified by the signalling transmitted by the transceiver are selected by the controller from within one or more of a plurality of sets of communication resources, each set of communication resources being associated with a different respective range of possible speeds of the first terminal device as determined in accordance with a predetermined characteristic of the sets of communication resources, and wherein the communication resources of a particular set of communication resources are for use by the first terminal device in exchanging signalling with the second terminal device when the first terminal device is travelling at a speed which is within the range of possible speeds associated with that particular set of communication resources.

In an embodiment, the signalling transmitted to the first terminal device identifies the communication resources of each of the sets of communication resources.

In an embodiment, the transceiver is operable to receive signalling from the first terminal device indicative of the speed of the first terminal device; the controller is operable to determine communication resources for use by the first terminal device in exchanging signalling with the second terminal device, the identified communication resources being communication resources from the set of communication resources associated with the range of possible speeds of the first terminal device within which the indicated speed of the first terminal device is found; and the transceiver is operable to transmit signalling to the first terminal device indicative of the determined communication resources.

In an embodiment, the signalling transmitted to the first terminal devices identifies the communication resources of each of a portion of the sets of communication resources, each set in the portion of sets being associated with a different respective range of possible speeds of the first terminal device within a predetermined speed constraint, and wherein: the transceiver is operable to receive signalling from the first terminal device indicative of the speed of the first terminal device when the speed of the first terminal device is outside of the predetermined speed constraint; in response to receiving the signalling from the first terminal device indicative of the speed of the first terminal device, the controller is operable to newly determine communication resources for use by the first terminal device in exchanging signalling with the second terminal device, the newly determined communication resources being communication resources from the set of communication resources associated with the range of possible speeds of the first terminal device within which the determined speed of the first terminal device is found; and the transceiver is operable to transmit signalling to the first terminal device indicative of the newly determined communication resources.

In an embodiment, the predetermined speed constraint is that each possible speed of the first terminal device within the range of possible speeds associated with each set of communication resources in the portion of sets of communication resources is less than a predetermined speed.

In an embodiment, the predetermined speed constraint is that each possible speed of the first terminal device within the range of possible speeds associated with each set of communication resources in the portion of sets of communication resources is greater than a predetermined speed.

In an embodiment, the predetermined characteristic in accordance with which each set of communication resources is associated with a different respective range of possible speeds of the first terminal device is a cell coverage area over which each set of communication resources is utilised, wherein a set of communication resources utilised over a larger coverage area is associated with a higher range of possible speeds of the first terminal device and a set of communication resources utilised over a smaller coverage area is associated with a lower range of possible speeds of the first terminal device.

In an embodiment, the controller is operable to control the transceiver to transmit signalling to the first terminal device identifying further communication resources for use by the first terminal device in exchanging signalling with the second terminal device, wherein the further communication resources identified by the signalling transmitted by the transceiver are selected by the controller from within one or more further sets of communication resources, each further set of communication resources being associated with a different event priority level detectable by the first terminal device, the event priority level indicating a level of severity of an event detectable by the first terminal device, and wherein the communication resources of a particular further set of communication resources are for use by the first terminal device in exchanging signalling with the second terminal device when the first terminal device determines that an event has occurred and that the event priority level of the determined event is the event priority level associated with that particular further set of communication resources.

In a third aspect, the present technique provides a wireless telecommunications system comprising a first terminal device according to the first aspect, a second terminal device with which the first terminal device is operable to exchange signalling, and infrastructure equipment according to the second aspect.

In a fourth aspect, the present technique provides a method of operating a first terminal device for use with a wireless telecommunications system, the method comprising: controlling a transceiver of the first terminal device to exchange signalling with a second terminal device using communication resources from within one of a plurality of sets of communication resources, each set of communication resources being associated with a different respective range of possible speeds of the first terminal device, the association being determined in accordance with a predetermined characteristic of the sets of communication resources; and controlling the transceiver to exchange signalling with the second terminal device using communication resources from within the set of communication resources associated with the range of possible speeds of the first terminal device within which a determined speed of the first terminal device is found.

In a fifth aspect, the present technique provides a method of operating infrastructure equipment for use with a wireless telecommunications system, the method comprising controlling a transceiver of the infrastructure equipment to transmit signalling to a first terminal device identifying communication resources for use by the first terminal device in exchanging signalling with a second terminal device, wherein the communication resources identified by the signalling transmitted by the transceiver are selected from within one or more of a plurality of sets of communication resources, each set of communication resources being associated with a different respective range of possible speeds of the first terminal device as determined in accordance with a predetermined characteristic of the sets of communication resources, and wherein the communication resources of a particular set of communication resources are for use by the first terminal device in exchanging signalling with the second terminal device when the first terminal device is travelling at a speed which is within the range of possible speeds associated with that particular set of communication resources.

In a sixth aspect, the present technique provides a first terminal device for use with a wireless telecommunications system, the first terminal device comprising: transceiver circuitry operable to exchange signalling with a second terminal device using communication resources from within one of a plurality of sets of communication resources, each set of communication resources being associated with a different respective range of possible speeds of the first terminal device, the association being determined in accordance with a predetermined characteristic of the sets of communication resources; and controller circuitry operable to control the transceiver to exchange signalling with the second terminal device using communication resources from within the set of communication resources associated with the range of possible speeds of the first terminal device within which a determined speed of the first terminal device is found.

In a seventh aspect, the present technique provides infrastructure equipment for use with a wireless telecommunications system, the infrastructure equipment comprising: transceiver circuitry; and controller circuitry; wherein the controller circuitry is operable to control the transceiver circuitry to transmit signalling to a first terminal device identifying communication resources for use by the first terminal device in exchanging signalling with a second terminal device, wherein the communication resources identified by the signalling transmitted by the transceiver circuitry are selected by the controller circuitry from within one or more of a plurality of sets of communication resources, each set of communication resources being associated with a different respective range of possible speeds of the first terminal device as determined in accordance with a predetermined characteristic of the sets of communication resources, and wherein the communication resources of a particular set of communication resources are for use by the first terminal device in exchanging signalling with the second terminal device when the first terminal device is travelling at a speed which is within the range of possible speeds associated with that particular set of communication resources.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
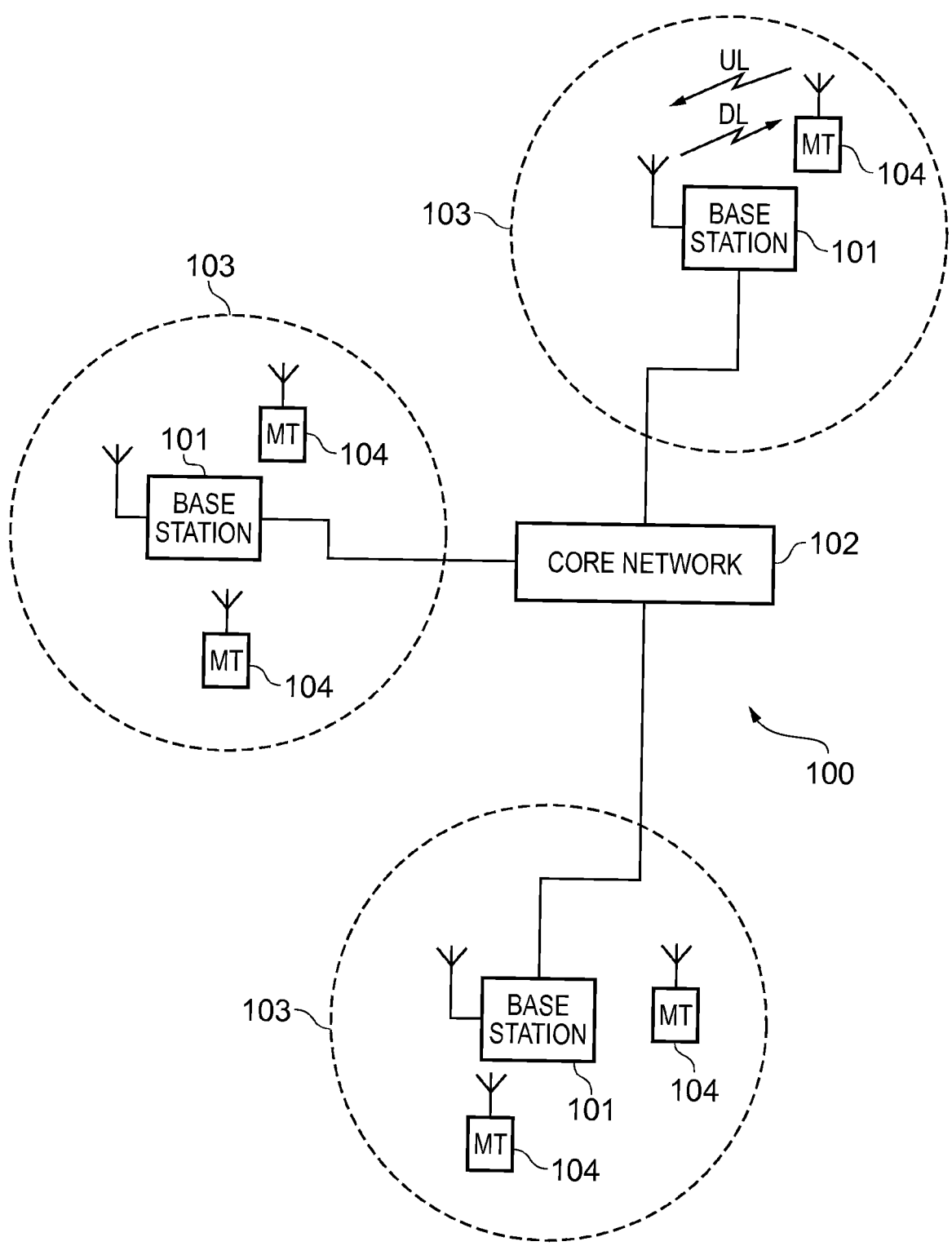
FIG. 1 schematically illustrates some basic functionality of a conventional mobile telecommunications network.

Referring now to the drawings, wherein like reference numerals designate identical or corresponding parts throughout the several views.

FIG. 1 provides a schematic diagram illustrating some basic functionality of a conventional mobile telecommunications network, using for example a 3GPP defined UMTS and/or Long Term Evolution (LTE) architecture. The mobile telecommunications network/system 100 of FIG. 1 operates in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [2]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that are licensed for use by the operator of the network 100. The core network 102 routes data to and from the terminal devices 104 via the respective base stations 101 and provides functions such as authentication, mobility management, charging and so on. Terminal devices may also be referred to as mobile stations, user equipment (UE), user terminal, mobile terminal, mobile device, terminal, mobile radio, and so forth. Base stations may also be referred to as transceiver stations/nodeBs/e-nodeBs/eNodeB, eNB, and so forth. Base stations and RSUs may generally be referred to as infrastructure equipment.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

The base stations 101 of FIG. 1 may be realised as any type of evolved Node B (eNodeB) such as a macro eNodeB and a small eNodeB. The small eNodeB may be an eNodeB such as a pico eNodeB, a micro eNodeB, and a home (femto) eNodeB that covers a cell smaller than a macro cell. Instead, the base station 101 may be realized as any other types of base stations such as a NodeB and a base transceiver station (BTS). The base station 101 may include a main body (that is also referred to as a base station apparatus) configured to control radio communication, and one or more remote radio heads (RRH) disposed in a different place from the main body. In addition, various types of terminals, which will be described below, may each operate as the base station 101 by temporarily or semi-persistently executing a base station function.

Any of the terminal devices 104 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The terminal device 104 may also be realized as a terminal (that is also referred to as a machine type communication (MTC) terminal) that performs machine-to-machine (M2M) communication. Furthermore, the terminal device 104 may be a radio communication module (such as an integrated circuit module including a single die) mounted on each of the terminals.

In the present disclosure, a base station providing a small cell is generally differentiated from a conventional base station mostly (and sometimes exclusively) in the range provided by the base station. Small cells include for example the cells also called femtocell, picocell or microcell. In other words, small cells can be considered as similar to macrocells in the channels and features provided to the terminals, but with the use of less power for base station transmissions, which results in a smaller range. A small can therefore be the cell or coverage provided by a small cell base station. In other examples, the term small cell can also refer to a component carrier when more than one component carriers are available.

Moreover, mobile networks can also include Relay Nodes (RN) which can further increase the complexity of the mobile system and of the reduction of interference in a small cell network. Relay technologies are known generally to provide an arrangement for receiving signals from a base station and for retransmitting the received signals to a UE in a mobile communications network, or to receive signals transmitted from a UE for re-transmission to a base station of a mobile communications network. The aim of such relay nodes is to try to extend a radio coverage area provided by a mobile communications network to reach communications devices which would otherwise be out of range of the mobile communications network or to improve the ratio of successful transmissions between a terminal and a base station.

A mobile network which includes a variety of base stations and/or relay nodes (e.g. macro-cell base stations, small cell base stations and/or relays) is sometimes referred to as a heterogeneous network.

Figure 2:
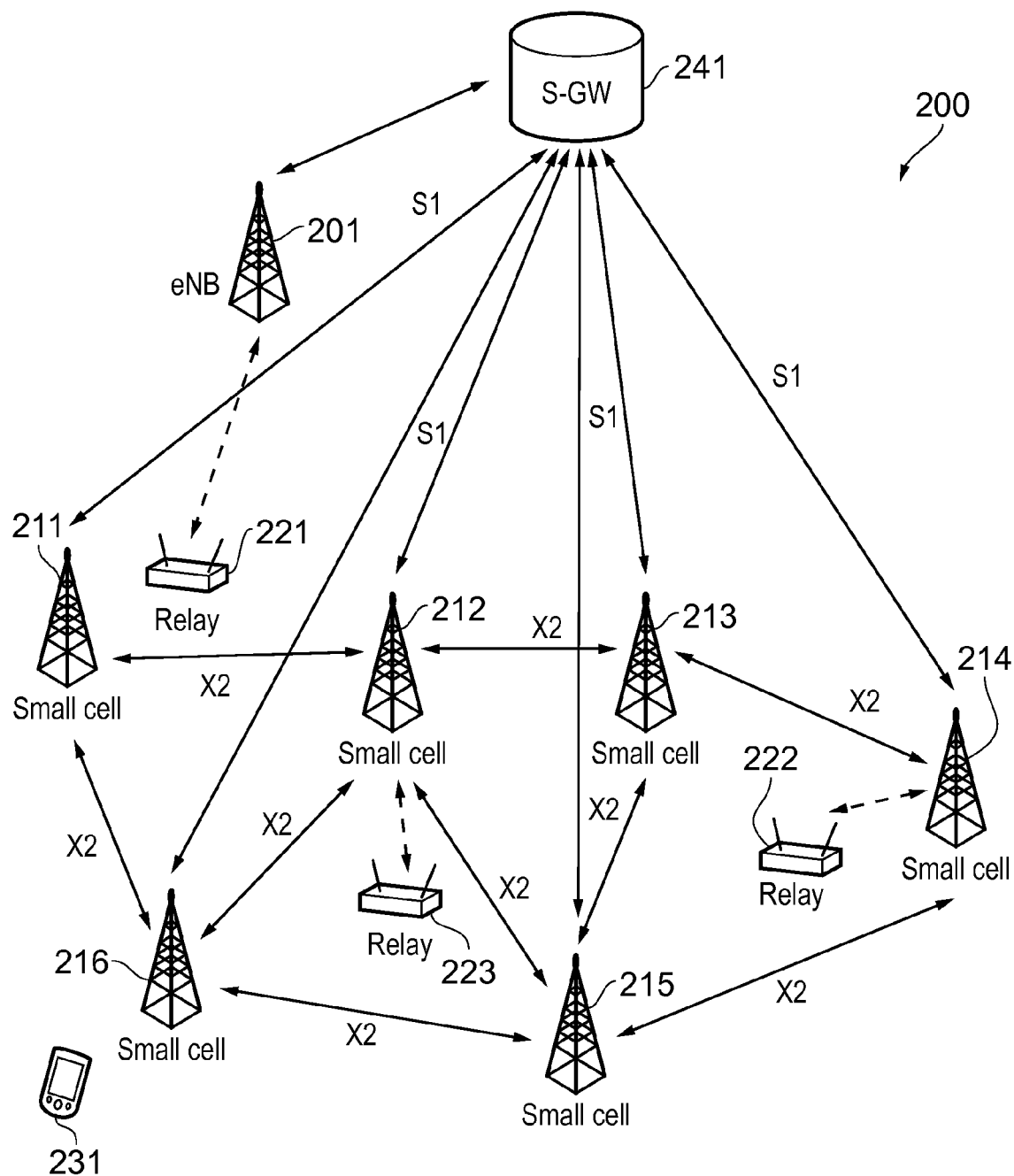
FIG. 2 schematically illustrates an example heterogeneous system for communicating with at least one terminal device.

FIG. 2 illustrates an example heterogeneous system 200 for communicating with at least a terminal 231. In this system 200, a base station 201 provides a macrocell and six base stations 211-216 provide small cell coverage, potentially overlapping with the coverage of the base station 201. Additionally, three RN 221-223 are provided and are operating with base stations 201, 214 and 212, respectively. A relay node can generally be defined as a wireless radio access point for relaying transmission and which thus does not implement all of the functionalities of a base station. It is in general not directly connected to the core network but uses wireless access (inband or outband) for backhaul link to connect with a base station. In other examples, the backhaul link may also be provided over a wired connection. This is in contrast to a small cell base station which, as mentioned above, can generally operate like a base station and is thus connected to the core network, as illustrated by the arrows between the small cell base stations 211-216 and the Serving Gateway "S-GW" in FIG. 2.

As previously mentioned, it is envisaged that V2X communications will make use of device-to-device (D2D) communication techniques. However, as previously mentioned, because different vehicles travel at different speeds, there are certain characteristics of the D2D communication techniques used which may be adjusted depending on the speed of a vehicle so as to help allow reliable communication between vehicles. In particular, the communication resources (in particular, radio resources, such as LTE resource blocks) used for D2D communication may be made to depend on the speed of a vehicle. It is the implementation of such a speed dependence on the communication resources used for D2D communication which is addressed by the present technique.

In an embodiment of the present technique, communication resources are provided to the V2X UE. The communication resources are selected dependent on the speed of the vehicle on or within which the V2X UE is located. The coverage area of the communication resources used may be different depending on the speed (for example, low mobility resources for lower speed vehicles may be cell specific, where as high mobility resources for higher speed vehicles may be specific to a larger number of cells in order to avoid frequent reconfiguration during a transmission). Properties of the resource sets may also differ. For example, the resource sets may be configured in a particular way so as to support UEs at particular speeds. Furthermore, the mode of operation may differ. For example, slower speed UEs may use a scheduled resource allocation mode (either communicating with other UEs via an eNB or RSU, or being scheduled to perform D2D communication with other UEs by an eNB). Those UEs may then switch to using D2D autonomous resource allocation at higher speeds (autonomous resource allocation requiring no signalling from an eNB or RSU in order for resources to be allocated to the UE) so that frequent cell change or potential connection or handover failure does not impact the ongoing direct communication between vehicles. Alternatively, the reverse may be configured, to give tighter network control at higher speeds. The configuration signalling of resources may also differ. For example, depending on the spanned area of the resources and the operation mode, the notification signalling which allows communication resources to be allocated for use by V2X UEs (such as broadcast signalling, dedicated signalling or inter-eNB (inter-PLMN (Public Land Mobile Network)) coordination) may be different.

In a further embodiment of the present technique, the determination of the speed of a V2X UE by that UE may be enhanced by utilising external equipment to the UE. For example the built in speedometer of a vehicle provides a more accurate speed and acceleration estimation than conventional 3GPP methods (which are based on, for example, counting the number of cell changes in order to estimate the UE speed), and thus the UE may determine its speed based on an input to the UE from the vehicle speedometer. Alternatively, the UE may determine its speed based on an input to the UE from a satellite navigation device (such as a Global Positioning System (GPS) device). Taking advantage of such methods of speed estimation allows for more precise tuning of parameters (including the communication resources to be used) than current 3GPP mobility state estimation techniques. In particular, the more accurate mobility estimation may be reported to an eNB, allowing the eNB to perform resource configuration based on the report, or a UE may automatically take it into account based on a plurality of configurations or based on scaling of parameters.

In a further embodiment of the present technique, other input data may be used to help select appropriate communication resources. For example, an image sensor can be used to detect collisions early and an input from the image sensor may then be used to switch resource set used by the UE.

Further details about embodiments of the present technique are described in more detail below.

Figure 3:
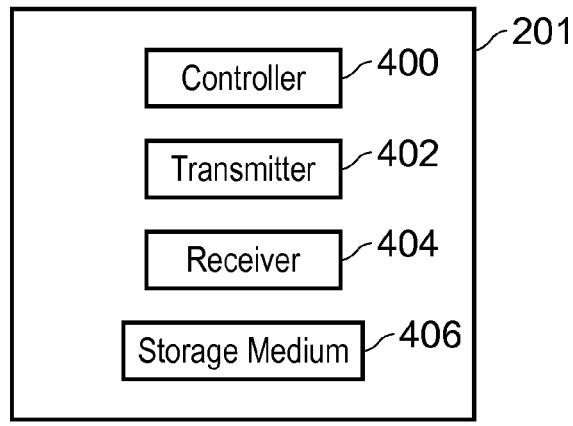
FIG. 3 schematically illustrates a base station according to an embodiment of the present disclosure.

FIG. 3 schematically illustrates infrastructure equipment 201 according to an embodiment of the present disclosure. The infrastructure equipment 201 may be, for example, a base station or an RSU. The infrastructure equipment 201 comprises a transmitter 402 for transmitting data to a terminal device (or UE), a receiver 404 for receiving data from a terminal device and a storage medium 406 for storing information identifying communication resources for use by a terminal device in performing D2D communication with another terminal device. The operation of each of the transmitter 402, receiver 404 and storage medium 406 is controlled by the controller 400. It is also noted that the transmitter 402 and receiver 404 together form a transceiver.

In the following description, the infrastructure equipment is a base station. However, it will be appreciated that the following description will also apply if the infrastructure equipment is an RSU.

Figure 4:
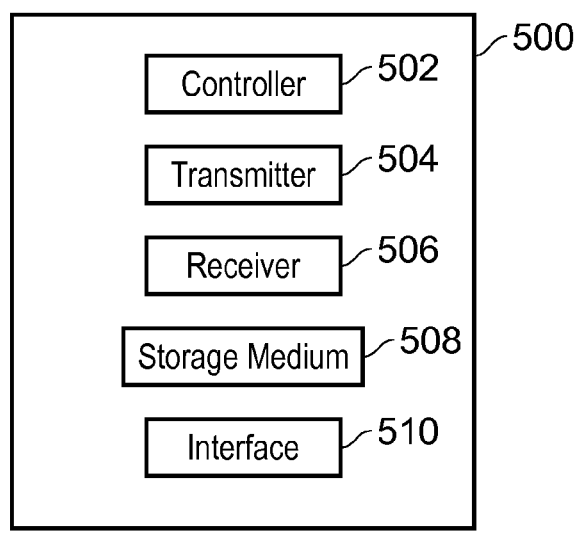
FIG. 4 schematically illustrates a terminal device according to an embodiment of the present disclosure.

FIG. 4 schematically illustrates a terminal device 500 according to an embodiment of the present disclosure. The terminal device comprises a transmitter 504 for transmitting data to infrastructure equipment or to another terminal device (using a D2D communication technique, for example), a receiver 506 for receiving data from infrastructure equipment or from another terminal device (again, using a D2D communication technique, for example) and a storage medium 508 for storing information identifying communication resources for use by the terminal device in performing D2D communication with another terminal device. The speed of the terminal device 500 may be determined by the controller 502 based on known 3GPP mobility estimation techniques. Alternatively, the terminal device may comprise an interface 510 (as shown as an optional component of the terminal device 500) for enabling communication of the terminal device 500 with another, external device (such as a vehicle speedometer or satellite navigation device, for example) configured to determine the speed of the terminal device 500 and input the speed to the controller 502 of the terminal device 500 via the interface 510. The operation of each of the transmitter 504, receiver 506, storage medium 508 and interface 510 (where present) is controlled by the controller 502. It is noted that the transmitter 504 and receiver 506 together from a transceiver. Each V2X UE according to embodiments of the present technique has a structure as shown in FIG. 4.

Figure 5:
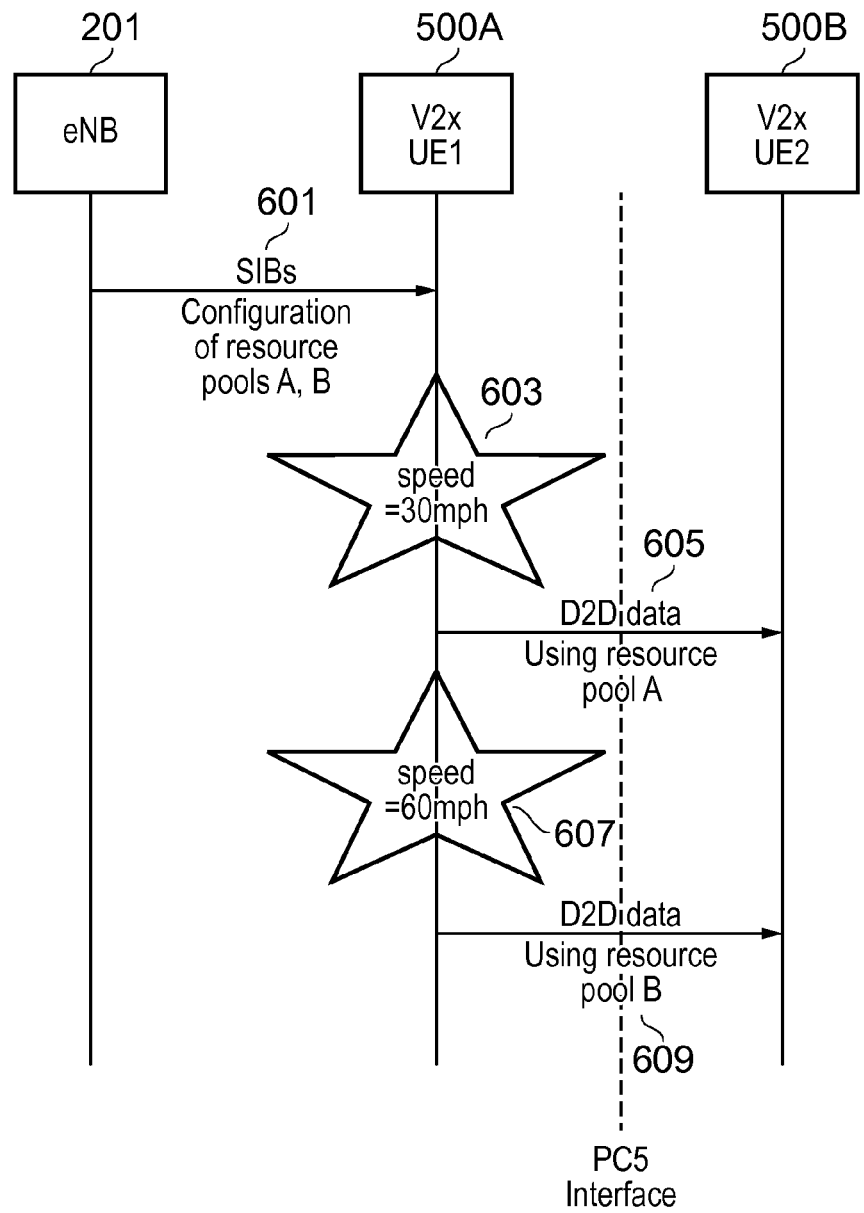
FIG. 5 schematically shows a first signalling arrangement according to an embodiment of the present disclosure.

FIG. 5 schematically shows one embodiment of the present technique. In this embodiment, the network (NW) configures multiple communication resource pools for D2D autonomous resource selection by a UE, and the UE selects one of the resource pools depending on its mobility state. It is currently known that multiple resource pools can be configured for D2D, and thus, with this embodiment, an associated mobility state is added to each resource pool (so that a first resource pool is associated with a first mobility state, a second resource pool is associated with a second mobility state, and so on). It is noted that a mobility state represents the speed of the UE relative to infrastructure equipment of the network (such as base stations, RSUs and the like). The possible mobility states may be, for example, low (representing a first range of possible speeds of the UE), medium (representing a second range of possible speeds of the UE, each possible speed in the second range being higher than each possible speed in the first range) and high (representing a third range of possible speeds of the UE, each possible speed in the third range being higher than each possible speed in the second range). As previously mentioned, it is currently known to estimate the mobility state of a UE based on counting the number of cell changes within a given time (this is carried out by the controller 502 of the UE). This estimation technique could be re-used in determining the appropriate resource pool. Alternatively, however, the UE may utilise the more accurate speed estimation methods already available, such as the speedometer which is already built in to a vehicle, by use of satellite navigation (sat nav) estimation, by using sensors placed externally on the vehicle such as image sensors to estimate relative speed compared to another vehicle, or by using any other suitable instruments which may be available in the vehicle. In general, it will be appreciated that any external equipment suitable for determining the speed of the UE as it travels may be used by the UE for speed estimation. As previously described, the input from such external equipment is input to the controller 502 of the UE for mobility state estimation via the interface 510.

An example implementation of the first embodiment is shown in FIG. 5. Here, signalling between a base station 201 and two UEs 500A and 500B (each of these being a V2X UE) is shown. At a first step 601, the base station notifies UE 500A of the resource pools associated with each mobility state. Each resource pool is a set of predetermined communication resources (such as LTE resource blocks) which have been selected by the network for use by the UE 500A in performing D2D communication with other UEs (such as UE 500B) at a particular mobility state of the UE 500A. In this example, the resource pools (together with the mobility state associated with each resource pool) are notified to the UE 500A via LTE System Information Blocks (SIBs), although it will appreciated that any other suitable technique of signalling the resource pools and associated mobility states to the UE 500A could be used. It will also be appreciated that the UE 500A may be preconfigured with information identifying the resource pools (for example, during manufacture or via a software update), in which case the initial signalling from the network during step 601 would not be required.

Once the resource pools and associated mobility states have been received by the UE 500A, at a second step 603, the UE 500A determines its speed (using one of the techniques previously described). At step 603, the UE 500A determines its speed to be 30 miles per hour (mph). 30 mph falls within the mobility state associated with resource pool A (thus, resource pool A is associated with a mobile state defined by a range of possible speeds which includes 30 mph), and thus, in step 605, the UE 500A proceeds to perform D2D communication with the UE 500B using communication resources from the resource pool A.

At a later time, however, at step 607, the UE 500A once again determines its speed and determines that it is now travelling at 60 mph. This may happen, for example, if the vehicle within which the UE 500A is located leaves a slower road in which the speed limit is 30 mph and joins a faster road in which the speed limit is 60 mph. 60 mph falls within the mobility state associated with resource pool B (thus, resource pool B is associated with a mobile state defined by a higher range of possible speeds which includes 60 mph), and thus, in step 607, the UE 500A switches to perform D2D communication with the UE 500B using communication resources from the resource pool B.

It is noted that, in an embodiment, the communication resources included in each resource pool are determined based on a characteristic of those communication resources that make them suitable for the mobility state associated with that pool. For example, the communication resources allocated to resource pool B may be associated with a wider coverage area (for example, they may allocated to the UE 500A for use in D2D communication by other neighbouring base stations of the base station 201) than the communications resources allocated to pool A. This allows handover to the use of different communication resources for D2D communication to be required less often when the UE 500A is travelling at higher speeds, thus reducing the chance of delay or failure. To put this in more detail, if the coverage area associated with resource pools A and B were the same, then handover to different resource pools (for example, as the UE 500A leaves the coverage area of base station 201 and enters the coverage area of a different base station which allocates different resources for D2D communication) would occur more often for high speed UEs (which will leave the coverage area of any given base station more quickly) than for low speed UEs (which will leave the coverage area of any given base station more slowly). This is undesirable, since such handover is associated with a risk of delay or failure, and such delay or failure increases the risk that there may be a time period in which high speed UEs suddenly cannot communicate with each other. By providing a wider coverage resource pool B (for higher speeds) and a lower coverage resource pool A (for lower speeds), this problem is therefore alleviated.

It is also envisaged that each resource pool may have differences in another characteristic (instead of or in addition to coverage area) so as to improve their suitability for the mobility state with which they are associated. For example, the resources could be selected based on transmission format or the like (for example, with the transmission format of the communication resources of pool A being chosen for the lower mobility state associated with pool A and the transmission format of the communication resources of pool B being chosen for the higher mobility state associated with pool B). It will be appreciated the D2D communication resources allocated for use by UEs in different mobility states could differ in any number of characteristics so as to improve their suitability for a particular mobility state.

Figure 6:
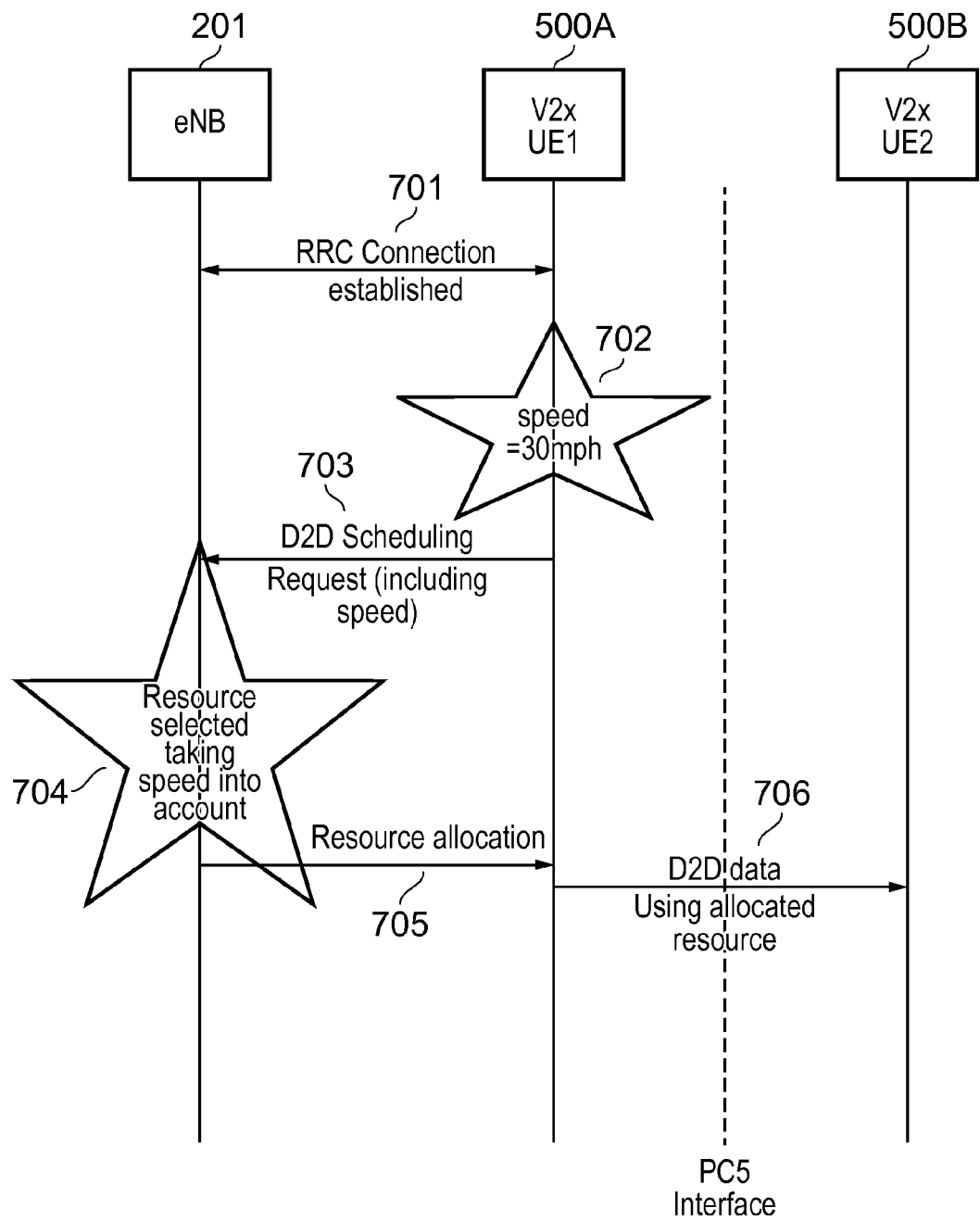
FIG. 6 schematically shows a second signalling arrangement according to an embodiment of the present disclosure.

FIG. 6 schematically shows another embodiment of the present technique. In this case, instead of resource pools for each mobility state being determined by the network and notified to a UE in advance (for the UE to then autonomously choose which resource pool to use depending on its speed, as is the case in the arrangement FIG. 5), the base station 201 instead schedules appropriate communication resources to the UE based on reports received from the UE which indicate the speed of the UE. In particular, the UE requesting resources from the network may include a speed estimation indication in, for example, the D-SR (Dedicated Scheduling Request) or BSR (buffer status report) or a new MAC Control Element (MAC CE), or the UE could separately update the network of its speed using radio resource control (RRC) signalling whenever the speed changes. This would enable the eNB to determine which resources would be best suited (based on characteristics such as coverage area, transmission format, etc., as previously discussed), and allocate resources to the UE accordingly.

An example implementation of such an embodiment is shown in FIG. 6. At step 701, an RRC connection is established between the base station 201 and UE 500A. At step 702, the UE 500A then determines its current speed. In the example of FIG. 6, the UE's speed is 30 mph. At step 703, the UE 500A transmits a D2D scheduling request to the base station 201. The D2D scheduling request includes the current speed of the UE (30 mph). At step 704, the network, based on the speed reported by the UE, determines communication resources for use by the UE in performing D2D communication. These resources are then allocated and scheduled to the UE 500A at step 705. At step 706, the UE 500A then performs D2D communication with the UE 500B using the resources scheduled during step 705.

Whenever the UE 500A detects a change in its speed (or, alternatively, for example, a change in speed which exceeds a predetermined change threshold), steps 703 to 706 can be repeated so that, if there are more suitable communication resources for use by the UE 500A at this new speed, then these new resources can be scheduled to the UE 500A by the network. This allows the most appropriate communication resources to be allocated to the UE 500A at a given speed. It will also be appreciated that other communication configurations (such as transmission format or the like, as previously discussed) could also be notified to the UE in a similar way.

Figure 7:
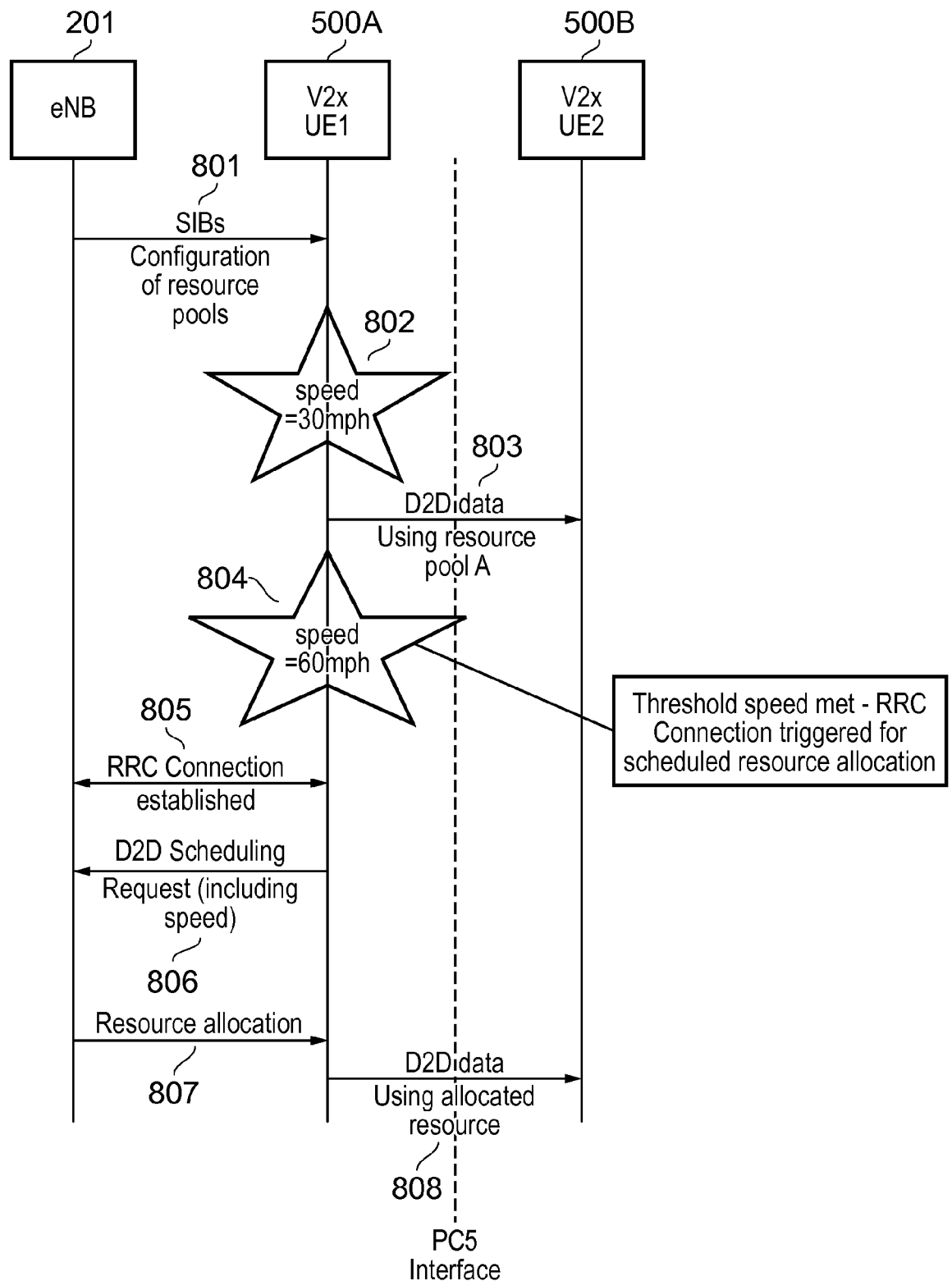
FIG. 7 schematically shows a third signalling arrangement according to an embodiment of the present disclosure.

FIG. 7 schematically shows another embodiment of the present technique. In this embodiment, when the UE 500A determines that it is travelling below a predetermined threshold speed, the UE 500A performs D2D communication with the UE 500B using communication resources of a resource pool which has been notified to the UE in advance (in the same way as discussed with reference to FIG. 5). On the other hand, when the UE 500A determines that it is travelling above the predetermined threshold speed, then it transmits a scheduling request to the base station 201. In response, the base station 201 then schedules specific D2D resources for use by the UE 500A in exchanging signalling with UE 500B (in the same way as discussed with reference to FIG. 6). Thus, at lower speeds (that is, speeds below the predetermined threshold speed), the UE 500A selects D2D communication resources autonomously without the need for additional signalling from the network. On the other hand, at higher speeds (that is, speeds above the predetermined threshold speed), the UE 500A uses D2D resources which have been scheduled to it by the network, thus allowing tighter coordinated resource scheduling for higher speed vehicles (which may travel past several base stations or RSUs in quick succession) and reducing the chance of high speed vehicle collision.

An example implementation of such an embodiment is shown in FIG. 7. At step 801, the base station 201 notifies the UE 500A of the resource pool configuration (including the communication resources allocated to each pool, the mobility state with which each pool is associated, the transmission format associated with each pool, etc., as previously discussed). At step 802, the UE 500A determines its current speed. In the example of FIG. 7, the speed of the UE 500A is determined to be 30 mph. This is below the predetermined threshold speed (which, in this example, is 60 mph), and therefore, at step 803, the UE 500A performs D2D communication with the UE 500B using communication resources from the resource pool associated with the mobility state associated with 30 mph. The UE 500A will continue performing communication with the UE 500B in this way (that is, using the predefined resource pools) for as long as its speed remains below the predetermined threshold.

At step 804, however, the UE 500A determines its speed to be 60 mph. The predetermined speed threshold of 60 mph is therefore met. In response, an RRC connection between the UE 500A and base station 201 is initiated at step 805. The UE 500A then transmits a scheduling request to the base station 201 at step 806. In response, the base station schedules specific D2D resources to the UE 500A at step 807. At step 808, the UE 500A then performs D2D communication with the UE 500B using the newly scheduled resources (rather than communication resources from one of the predefined resource pools, as occurred previously).

It is noted that an alternative to the arrangement of FIG. 7 is that the UE uses the notified resource pools at lower speeds (as per FIG. 7), but then instead of triggering RRC connection and then being configured with scheduled resource allocation once the predetermined threshold speed has been reached, the base station 201 may instead provide a new resource pool to the UE 500A to use in the autonomous mode at higher speeds. The resources pools used at low speed will be applicable in that cell. On the other hand, when the network provides a new resource pool to the UE 500A using dedicated signalling in the case that the predetermined threshold speed is exceeded, these resources could be valid even after cell change (thus allowing use of these resources over a wider coverage area and allowing the benefit of reduced risk of handover delay or failure to be realised). The area validity for a new pool of resources may be provided in the dedicated signalling from the base station 201 to the UE 500A which configures the resources.

It will also be appreciated that the embodiment of FIG. 7 could be implemented the other way round, that is, so that resources are scheduled to the UE 500A in response to the UE 500A transmitting a scheduling request at lower speeds, and then, once the predetermined threshold speed has been exceeded, the UE 500A starts using resources from a predefined resource pool allocated for use by the UE 500A at higher speeds. Thus, in this alternative embodiment, when the UE 500A is travelling below 60 mph, it will use resources scheduled to it by the base station 201 (or, alternatively, lower speed resource pools allocated to it by the base station 201), but once the UE 500A reaches 60 mph (as the predetermined threshold speed), it will use the resources of a predefined high speed resource pool. One or more high speed resource pools may be notified to the UE 500A using the same technique as used in step 801 in FIG. 7 for allocating low speed resource pools (for example, using SIBs). Using this alternative embodiment, the need for handover operations is reduced at higher speeds because the UE 500A already knows to use communication resources from a predefined resource pool and does not have to wait for notification of which resources to use from a base station. The risk of communication failure due to handover failure or delay is therefore reduced. In this case, the predefined resource pools are common to a plurality of base stations over a predetermined geographical area (for example, they are broadcast by each base station over a predetermined geographical area) and thus the UE 500A may perform D2D communication with other UEs when travelling at high speed using communication resources from the predefined resource pools when located at any point within the predetermined geographical area.

In another embodiment, communication resources (either forming part of a resource pool provided to a UE or being scheduled to a UE) may be associated with a predetermined priority as well as with a predetermined mobility state. The priorities may be associated with certain areas (for example, certain busy roads) or certain vehicles (for example, emergency vehicles such as the police, fire or ambulance). In this case, communication resources may be used by a UE when both speed and priority requirements are met. For example, there may be resources associated with high speed (for example, the highest mobility state) and high priority. UEs could then only use those resources when they have the highest mobility state and satisfy the appropriate high priority requirement. For example, the UE may have to be travelling on a certain road (for example, this could be determined by a sat nav system, or could be determined based on the base station or RSUs within range of the UE) or may have to be associated with a certain type of vehicle such as an emergency vehicle (whether or not this is the case could be pre-programmed into the controller 502, for example). When both the mobility state and priority requirements of particular resources are met by a UE, resources from a resource pool associated with that mobility state and priority may be selected (in the case of autonomous resource selection mode) or resources associated with that mobility state and priority may be indicated in the scheduling request (scheduled resource selection mode). It will be appreciated that there are many ways in which different communication resources could be associated with different factors (such as priorities) in addition to being associated with different UE mobility states.

In a further example, the resource selection is not only based on speed, but also on input from other instruments in the vehicle such as an image sensor indicating that there is a chance of a collision. Such image sensors are known. For example, in some vehicles, they are used to detect when there is a chance of a collision and input from the sensor is used to trigger automatic braking of the vehicle. In an embodiment, such sensors are used to trigger certain resources (in particular, certain resource pools) to be used in V2X communication. Certain common and/or pre-configured communication resources which have been configured in advance may be allocated for use during events with different priority levels (so that, for example, one set or resources is used in response to detection of a life critical event, a different set of resources is used in response to a warning event, a different set of resources is used in response to a periodical event, etc.). In one example, once a life critical event has been triggered (based on input from the image sensor), the UE will select the resources allocated for use during a life critical event from a resource pool. This is autonomous resource selection, and has the benefit of reduced delay. Alternatively, the UE may send a scheduling request to an RSU or base station for the utilization of the resources allocated for use during a life critical event. This is scheduled resource selection, and has the benefit of better coverage (since the network can co-ordinate all other UEs in the area such that they can receive signalling using the allocated resources). In this latter case, every potential receiver UE will periodically check the scheduling assignment information for the set of resources allocated to life critical events, and will switch to using these resources in the case that a life critical event has occurred (as indicated by the scheduling assignment information). This will allow each potential receiver UE to receive signalling from the UE which detected the life critical event using these resources. It is noted that input from a crash detecting image sensor (as described) may be provided to the controller 502 of a UE via the interface 510.

It is noted that the above-mentioned resource pool configuration may also be applied in respect of scheduling control (SC) resources. For example, separate pools of SC resources may be configured based on mobility state and/or other criteria such as event priority level. It is possible for multiple SC pools to map to one data resource pool. For example, low and intermediate SC pools may point to the same shared data resource pool.

Thus, embodiments of the present technique provide a first terminal device (such as terminal device 500A) for use with a wireless telecommunications system. The first terminal device comprises a transceiver (formed from a transmitter 504 and receiver 506) operable to exchange signalling with a second terminal device (such as terminal device 500B) using communication resources from one of a plurality of sets of communication resources, each set of communication resources being associated with a different respective range of possible speeds of the first terminal device as determined in accordance with a predetermined characteristic (such as coverage area, transmission format, etc.) of the sets of communication resources. The first terminal device also comprises a controller 502 operable to control the transceiver to exchange signalling with the second terminal device using communication resources from the set of communication resources associated with the range of possible speeds of the first terminal device within which a determined speed of the first terminal device is found. It is noted that the second terminal device has the same internal structure as the first terminal device (as shown in FIG. 4).

The transceiver of the first terminal device is operable to receive signalling from infrastructure equipment (such as base station 201 or an RSU) identifying communication resources for use by the first terminal device in exchanging signalling with the second terminal device, the communication resources identified by the signalling received from the infrastructure equipment being selected by the infrastructure equipment from one or more of the sets of communication resources.

In one embodiment (as exemplified in FIG. 5, for example), the signalling received from the infrastructure equipment identifies the communication resources of each of the sets of communication resources. In this case, each set of communication represents a resource pool which is indicated to the first terminal device. The controller 502 thus determines the speed of the first terminal device (using input from external equipment via the interface 510, for example), selects the set of communication resources associated with the range of possible speeds of the first terminal device within which the determined speed of the first terminal device is found (thus selecting the appropriate resource pool), and controls the transceiver to exchange signalling with the second terminal device using communication resources from the selected set. The information identifying each resource pool is stored in the storage medium 508 of the first terminal device.

In another embodiment, the controller 502 of the first terminal device determines the speed of the first terminal device. It then controls the transceiver to transmit signalling to the infrastructure equipment identifying the determined speed, and to then receive signalling from the infrastructure equipment identifying communication resources for use by the first terminal device in exchanging signalling with the second terminal device. The identified communication resources are communication resources from the set of communication resources associated with the range of possible speeds of the first terminal device within which the determined speed of the first terminal device is found. In this case, the identified communication resources may form a resource pool from which the controller may select communication resources for use in exchanging signalling with the second terminal device. Alternatively, the identified communication resources may be scheduled to the first terminal device. The controller 502 then controls the transceiver to exchange signalling with the second terminal device using a portion of the identified communication resources (for example, by selecting resources from the newly identified resource pool or by using the scheduled resources). The information identifying the identified communication resources is stored in the storage medium 508 of the first terminal device.

In another embodiment, the signalling received from the infrastructure equipment identifies the communication resources of each of a portion of the sets of communication resources, each set in the portion of sets being associated with a different respective range of possible speeds of the first terminal device within a predetermined speed constraint. The identified communication resources of each set thus form respective resource pools, and the information identifying each resource pool is stored in the storage medium 508 of the first terminal device. The controller 502 then determines the speed of the first terminal device and determines whether the speed of the first terminal device is within the predetermined speed constraint. If it is determined that the speed of the first terminal device is within the predetermined speed constraint, then the controller 502 selects the set of communication resources already identified in the signalling received from the infrastructure equipment which is associated with the range of possible speeds of the first terminal device within which the determined speed of the first terminal device is found, and controls the transceiver to exchange signalling with the second terminal device using communication resources from the selected set. On the other hand, if it is determined that the speed of the first terminal device is outside of the predetermined speed constraint, then the controller 502 controls the transceiver to transmit signalling to the infrastructure equipment identifying the speed of the first terminal device, and controls the transceiver to receive new signalling from the infrastructure equipment newly identifying communication resources for use by the first terminal device in exchanging signalling with the second terminal device. The newly identified communication resources are communication resources from the set of communication resources associated with the range of possible speeds of the first terminal device within which the determined speed of the first terminal device is found. Again, the newly identified communication resources may form a resource pool from which the controller may select communication resources for use in exchanging signalling with the second terminal device. Alternatively, the newly identified communication resources may be scheduled to the first terminal device. The controller 502 then controls the transceiver to exchange signalling with the second terminal device using a portion of the newly identified communication resources (for example, by selecting resources from the newly identified resource pool or by using the newly scheduled resources). The information identifying the newly identified communication resources is stored in the storage medium 508 of the first terminal device.

In one embodiment, the predetermined speed constraint is that each possible speed of the first terminal device within the range of possible speeds associated with each set of communication resources in the portion of sets of communication resources is less than a predetermined speed. Alternatively, in another embodiment, the predetermined speed constraint is that each possible speed of the first terminal device within the range of possible speeds associated with each set of communication resources in the portion of sets of communication resources is greater than a predetermined speed. In the above examples, the predetermined speed is 60 mph (although it will be appreciated that any other predetermined speed may be chosen depending on the circumstances).

In one embodiment, the predetermined characteristic in accordance with which each set of communication resources is associated with a different respective range of possible speeds of the first terminal device is a cell coverage area over which each set of communication resources is utilized. In particular, a set of communication resources utilised over a larger coverage area (by, for example, being common to several instances of infrastructure equipment over a predetermined geographical area) is associated with a higher range of possible speeds of the first terminal device and a set of communication resources utilised over a smaller coverage area (by, for example, being associated only with one instance of infrastructure equipment over a predetermined geographical area) is associated with a lower range of possible speeds of the first terminal device. It will also be appreciated that another predetermined characteristic could be used for determining the different respective range of possible speeds with which each set of communication resources is associated, such as the transmission format used with the communication resources or the like.

In one embodiment, the controller 502 of the first terminal device is operable to receive an input external equipment in order to determine the speed of the first terminal device. This input is received via interface 510. The external equipment may be, for example, a vehicle speedometer, a sat nav system, or a vehicle image sensor which determines the speed of a vehicle relative to another vehicle.

In one embodiment, the transceiver of the first terminal device is operable to exchange signalling with the second terminal device using communication resources from within one or more further sets of communication resources, each further set of communication resources being associated with a different event priority level detectable by the first terminal device, the event priority level indicating a level of severity of an event detectable by the first terminal device. In other words, events with different levels of severity (that is, different levels of importance) are associated with different event priority levels. For example, there may be a further set of communication resources allocated for use following detection of a life critical event (highest severity event priority level), a further set of communication resources allocated for use following detection of a warning event (medium severity event priority level) and a further set of communication resources allocated for use following detection of a periodical event (lowest severity event priority level). The controller 502 of the first terminal device is then operable to determine whether an event has occurred (in response to, for example, input received from a vehicle image sensor via the interface 510), and when it is determined that an event has occurred, determine the event priority level of the event (based on, for example, a predetermined relationship (such as a lookup table) between detectable events and associated event priority levels stored in the storage medium 508), and control the transceiver to exchange signalling with the second terminal device using communication resources from within the further set of communication resources associated with the determined event priority level.

Embodiments of the present technique also provide infrastructure equipment (such as base station 201 or an RSU, an RSU, for the purpose of the present technique, having the same internal structure as base station 201 as shown in FIG. 3) for use with a wireless telecommunications system. The infrastructure equipment comprises a transceiver (formed from transmitter 402 and receiver 404) and a controller 400. The controller 400 is operable to control the transceiver to transmit signalling to a first terminal device identifying communication resources for use by the first terminal device in exchanging signalling with a second terminal device. The communication resources identified by the signalling transmitted by the transceiver are selected by the controller from one or more of a plurality of sets of communication resources. Each set of communication resources is associated with a different respective range of possible speeds of the first terminal device as determined in accordance with a predetermined characteristic of the sets of communication resources, and the communication resources of a particular set of communication resources are for use by the first terminal device in exchanging signalling with the second terminal device when the first terminal device is travelling at a speed which is within the range of possible speeds associated with that particular set of communication resources.

In one embodiment, the signalling transmitted to the first terminal device identifies the communication resources of each of the sets of communication resources. In this case, each set of communication represents a resource pool which is indicated to the first terminal device. The information identifying each resource pool is stored in the storage medium 406 of the infrastructure equipment.

In another embodiment, the transceiver of the infrastructure equipment is operable to receive signalling from the first terminal device indicative of the speed of the first terminal device. The controller 400 then determines communication resources for use by the first terminal device in exchanging signalling with the second terminal device, the identified communication resources being communication resources from the set of communication resources associated with the range of possible speeds of the first terminal device within which the indicated speed of the first terminal device is found. In this case, the identified communication resources may form a resource pool from which the first terminal device may select communication resources for use in exchanging signalling with the second terminal device. Alternatively, the identified communication resources may be scheduled to the first terminal device. The transceiver then transmits signalling to the first terminal device indicative of the determined communication resources. The information identifying the identified communication resources is stored in the storage medium 406 of the infrastructure equipment.

In another embodiment, the signalling transmitted to the first terminal device identifies the communication resources of each of a portion of the sets of communication resources, each set in the portion of sets being associated with a different respective range of possible speeds of the first terminal device within a predetermined speed constraint. The received communication resources of each set thus from respective resource pools, and the information identifying each resource pool is stored in the storage medium 406 of the infrastructure equipment. The transceiver is furthermore operable to receive signalling from the first terminal device indicative of the speed of the first terminal device when the speed of the first terminal device is outside of the predetermined speed constraint. In response to receiving the signalling from the first terminal device indicative of the speed of the first terminal device, the controller 400 is operable to newly determine communication resources for use by the first terminal device in exchanging signalling with the second terminal device, the newly determined communication resources being communication resources from the set of communication resources associated with the range of possible speeds of the first terminal device within which the determined speed of the first terminal device is found. Again, the newly determined communication resources may form a resource pool from which the first terminal device may select communication resources for use in exchanging signalling with the second terminal device. Alternatively, the newly determined communication resources may be scheduled to the first terminal device. The transceiver then transmits signalling to the first terminal device indicative of the newly determined communication resources. The information identifying the newly determined communication resources is stored in the storage medium 406 of the infrastructure equipment.

In one embodiment, the predetermined speed constraint is that each possible speed of the first terminal device within the range of possible speeds associated with each set of communication resources in the portion of sets of communication resources is less than a predetermined speed. Alternatively, in another embodiment, the predetermined speed constraint is that each possible speed of the first terminal device within the range of possible speeds associated with each set of communication resources in the portion of sets of communication resources is greater than a predetermined speed. In the above examples, the predetermined speed is 60 mph (although it will be appreciated that any other predetermined speed may be chosen depending on the circumstances).

In one embodiment, the predetermined characteristic in accordance with which each set of communication resources is associated with a different respective range of possible speeds of the first terminal device is a cell coverage area over which each set of communication resources is utilised, wherein a set of communication resources utilised over a larger coverage area (by, for example, being common to several instances of infrastructure equipment over a predetermined geographical area) is associated with a higher range of possible speeds of the first terminal device and a set of communication resources utilised over a smaller coverage area (by, for example, being associated only with one instance of infrastructure equipment over a predetermined geographical area) is associated with a lower range of possible speeds of the first terminal device. It will also be appreciated that another predetermined characteristic could be used for determining the different respective range of possible speeds with which each set of communication resources is associated, such as the transmission format used with the communication resources or the like.

In one embodiment, the controller 400 of the infrastructure equipment is operable to control the transceiver to transmit signalling to the first terminal device identifying further communication resources for use by the first terminal device in exchanging signalling with the second terminal device. The further communication resources identified by the signalling transmitted by the transceiver are selected by the controller from within one or more further sets of communication resources, each further set of communication resources being associated with a different event priority level detectable by the first terminal device, the event priority level indicating a level of severity of an event detectable by the first terminal device. In other words, events with different levels of severity (that is, different levels of importance) are associated with different event priority levels. For example, there may be a further set of communication resources allocated for use following detection of a life critical event (highest severity event priority level), a further set of communication resources allocated for use following detection of a warning event (medium severity event priority level) and a further set of communication resources allocated for use following detection of a periodical event (lowest severity event priority level). The communication resources of a particular further set of communication resources are for use by the first terminal device in exchanging signalling with the second terminal device when the first terminal device determines that an event has occurred and that the event priority level of the determined event is the event priority level associated with that particular further set of communication resources.

Various embodiments of the present technique are described with reference to the following numbered clauses:

1. A first terminal device for use with a wireless telecommunications system, the first terminal device comprising:
   a transceiver operable to exchange signalling with a second terminal device using communication resources from within one of a plurality of sets of communication resources, each set of communication resources being associated with a different respective range of possible speeds of the first terminal device, the association being determined in accordance with a predetermined characteristic of the sets of communication resources; and
   a controller operable to control the transceiver to exchange signalling with the second terminal device using communication resources from within the set of communication resources associated with the range of possible speeds of the first terminal device within which a determined speed of the first terminal device is found.

2. A first terminal device according to clause 1, wherein:
   the transceiver is operable to receive signalling from infrastructure equipment identifying communication resources for use by the first terminal device in exchanging signalling with the second terminal device, the communication resources identified by the signalling received from the infrastructure equipment being selected by the infrastructure equipment from one or more of the sets of communication resources.

3. A first terminal device according to clause 2, wherein the signalling received from the infrastructure equipment identifies the communication resources of each of the sets of communication resources, and the controller is operable to:
   determine the speed of the first terminal device;
   select the set of communication resources associated with the range of possible speeds of the first terminal device within which the determined speed of the first terminal device is found; and
   control the transceiver to exchange signalling with the second terminal device using communication resources from the selected set.

4. A first terminal device according to clause 1, wherein the controller is operable to:
   determine the speed of the first terminal device;
   control the transceiver to transmit signalling to the infrastructure equipment identifying the determined speed;
   receive the signalling from the infrastructure equipment identifying communication resources for use by the first terminal device in exchanging signalling with the second terminal device, the identified communication resources being communication resources from the set of communication resources associated with the range of possible speeds of the first terminal device within which the determined speed of the first terminal device is found; and
   control the transceiver to exchange signalling with the second terminal device using a portion of the identified communication resources.

5. A first terminal device according to clause 2, wherein the signalling received from the infrastructure equipment identifies the communication resources of each of a portion of the sets of communication resources, each set in the portion of sets being associated with a different respective range of possible speeds of the first terminal device within a predetermined speed constraint, and the controller is operable to:
   determine the speed of the first terminal device;
   determine whether the speed of the first terminal device is within the predetermined speed constraint;
   if it is determined that the speed of the first terminal device is within the predetermined speed constraint, select the set of communication resources identified in the signalling received from the infrastructure equipment which is associated with the range of possible speeds of the first terminal device within which the determined speed of the first terminal device is found, and control the transceiver to exchange signalling with the second terminal device using communication resources from the selected set; and if it is determined that the speed of the first terminal device is outside of the predetermined speed constraint, control the transceiver to transmit signalling to the infrastructure equipment identifying the speed of the first terminal device, control the transceiver to receive new signalling from the infrastructure equipment newly identifying communication resources for use by the first terminal device in exchanging signalling with the second terminal device, the newly identified communication resources being communication resources from the set of communication resources associated with the range of possible speeds of the first terminal device within which the determined speed of the first terminal device is found, and control the transceiver to exchange signalling with the second terminal device using a portion of the newly identified communication resources.

6. A first terminal device according clause 5, wherein the predetermined speed constraint is that each possible speed of the first terminal device within the range of possible speeds associated with each set of communication resources in the portion of sets of communication resources is less than a predetermined speed.

7. A first terminal device according clause 5, wherein the predetermined speed constraint is that each possible speed of the first terminal device within the range of possible speeds associated with each set of communication resources in the portion of sets of communication resources is greater than a predetermined speed.

8. A first terminal device according to any preceding clause, wherein the predetermined characteristic in accordance with which each set of communication resources is associated with a different respective range of possible speeds of the first terminal device is a cell coverage area over which each set of communication resources is utilised, wherein a set of communication resources utilised over a larger coverage area is associated with a higher range of possible speeds of the first terminal device and a set of communication resources utilised over a smaller coverage area is associated with a lower range of possible speeds of the first terminal device.

9. A first terminal device according to any one of clauses 3 to 7, wherein the controller is operable to receive an input from external equipment in order to determine the speed of the first terminal device.

10. A first terminal device according to any preceding clause, wherein:
the transceiver is operable to exchange signalling with the second terminal device using communication resources from within one or more further sets of communication resources, each further set of communication resources being associated with a different event priority level detectable by the first terminal device, the event priority level indicating a level of severity of an event detectable by the first terminal device; and
the controller is operable to:
determine whether an event has occurred; and
when it is determined that an event has occurred, determine the event priority level of the event, and control the transceiver to exchange signalling with the second terminal device using communication resources from within the further set of communication resources associated with the determined event priority level.

11. Infrastructure equipment for use with a wireless telecommunications system, the infrastructure equipment comprising:
a transceiver; and
a controller; wherein
the controller is operable to control the transceiver to transmit signalling to a first terminal device identifying communication resources for use by the first terminal device in exchanging signalling with a second terminal device, wherein the communication resources identified by the signalling transmitted by the transceiver are selected by the controller from within one or more of a plurality of sets of communication resources, each set of communication resources being associated with a different respective range of possible speeds of the first terminal device as determined in accordance with a predetermined characteristic of the sets of communication resources, and wherein the communication resources of a particular set of communication resources are for use by the first terminal device in exchanging signalling with the second terminal device when the first terminal device is travelling at a speed which is within the range of possible speeds associated with that particular set of communication resources.

12. Infrastructure equipment according to clause 11, wherein the signalling transmitted to the first terminal device identifies the communication resources of each of the sets of communication resources.

13. Infrastructure equipment according to clause 11, wherein:
the transceiver is operable to receive signalling from the first terminal device indicative of the speed of the first terminal device;
the controller is operable to determine communication resources for use by the first terminal device in exchanging signalling with the second terminal device, the identified communication resources being communication resources from the set of communication resources associated with the range of possible speeds of the first terminal device within which the indicated speed of the first terminal device is found; and
the transceiver is operable to transmit signalling to the first terminal device indicative of the determined communication resources.

14. Infrastructure equipment according to clause 11, wherein the signalling transmitted to the first terminal devices identifies the communication resources of each of a portion of the sets of communication resources, each set in the portion of sets being associated with a different respective range of possible speeds of the first terminal device within a predetermined speed constraint, and wherein:
the transceiver is operable to receive signalling from the first terminal device indicative of the speed of the first terminal device when the speed of the first terminal device is outside of the predetermined speed constraint;
in response to receiving the signalling from the first terminal device indicative of the speed of the first terminal device, the controller is operable to newly determine communication resources for use by the first terminal device in exchanging signalling with the second terminal device, the newly determined communication resources being communication resources from the set of communication resources associated with the range of possible speeds of the first terminal device within which the determined speed of the first terminal device is found; and
the transceiver is operable to transmit signalling to the first terminal device indicative of the newly determined communication resources.

15. Infrastructure equipment according to clause 14, wherein the predetermined speed constraint is that each possible speed of the first terminal device within the range of possible speeds associated with each set of communication resources in the portion of sets of communication resources is less than a predetermined speed.

16. Infrastructure equipment according to clause 14, wherein the predetermined speed constraint is that each possible speed of the first terminal device within the range of possible speeds associated with each set of communication resources in the portion of sets of communication resources is greater than a predetermined speed.

17. Infrastructure equipment according to any one of clauses 11 to 16, wherein the predetermined characteristic in accordance with which each set of communication resources is associated with a different respective range of possible speeds of the first terminal device is a cell coverage area over which each set of communication resources is utilised, wherein a set of communication resources utilised over a larger coverage area is associated with a higher range of possible speeds of the first terminal device and a set of communication resources utilised over a smaller coverage area is associated with a lower range of possible speeds of the first terminal device.

18. Infrastructure equipment according to any one of clauses 11 to 17, wherein the controller is operable to control the transceiver to transmit signalling to the first terminal device identifying further communication resources for use by the first terminal device in exchanging signalling with the second terminal device, wherein the further communication resources identified by the signalling transmitted by the transceiver are selected by the controller from within one or more further sets of communication resources, each further set of communication resources being associated with a different event priority level detectable by the first terminal device, the event priority level indicating a level of severity of an event detectable by the first terminal device, and wherein the communication resources of a particular further set of communication resources are for use by the first terminal device in exchanging signalling with the second terminal device when the first terminal device determines that an event has occurred and that the event priority level of the determined event is the event priority level associated with that particular further set of communication resources.

19. A wireless telecommunications system comprising a first terminal device according to any one of clauses 1 to 10, a second terminal device with which the first terminal device is operable to exchange signalling, and infrastructure equipment according to any one of clauses 11 to 18.

20. A method of operating a first terminal device for use with a wireless telecommunications system, the method comprising:
   controlling a transceiver of the first terminal device to exchange signalling with a second terminal device using communication resources from within one of a plurality of sets of communication resources, each set of communication resources being associated with a different respective range of possible speeds of the first terminal device, the association being determined in accordance with a predetermined characteristic of the sets of communication resources; and
   controlling the transceiver to exchange signalling with the second terminal device using communication resources from within the set of communication resources associated with the range of possible speeds of the first terminal device within which a determined speed of the first terminal device is found.

21. A method of operating infrastructure equipment for use with a wireless telecommunications system, the method comprising controlling a transceiver of the infrastructure equipment to transmit signalling to a first terminal device identifying communication resources for use by the first terminal device in exchanging signalling with a second terminal device, wherein the communication resources identified by the signalling transmitted by the transceiver are selected from within one or more of a plurality of sets of communication resources, each set of communication resources being associated with a different respective range of possible speeds of the first terminal device as determined in accordance with a predetermined characteristic of the sets of communication resources, and wherein the communication resources of a particular set of communication resources are for use by the first terminal device in exchanging signalling with the second terminal device when the first terminal device is travelling at a speed which is within the range of possible speeds associated with that particular set of communication resources.

22. A first terminal device for use with a wireless telecommunications system, the first terminal device comprising:
   transceiver circuitry operable to exchange signalling with a second terminal device using communication resources from within one of a plurality of sets of communication resources, each set of communication resources being associated with a different respective range of possible speeds of the first terminal device, the association being determined in accordance with a predetermined characteristic of the sets of communication resources; and
   controller circuitry operable to control the transceiver to exchange signalling with the second terminal device using communication resources from within the set of communication resources associated with the range of possible speeds of the first terminal device within which a determined speed of the first terminal device is found.

23. Infrastructure equipment for use with a wireless telecommunications system, the infrastructure equipment comprising:
   transceiver circuitry; and
   controller circuitry; wherein
   the controller circuitry is operable to control the transceiver circuitry to transmit signalling to a first terminal device identifying communication resources for use by the first terminal device in exchanging signalling with a second terminal device, wherein the communication resources identified by the signalling transmitted by the transceiver circuitry are selected by the controller circuitry from within one or more of a plurality of sets of communication resources, each set of communication resources being associated with a different respective range of possible speeds of the first terminal device as determined in accordance with a predetermined characteristic of the sets of communication resources, and wherein the communication resources of a particular set of communication resources are for use by the first terminal device in exchanging signalling with the second terminal device when the first terminal device is travelling at a speed which is within the range of possible speeds associated with that particular set of communication resources.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] RP-151109 "New SI proposal: Feasibility Study on LTE-based V2X Services" from LG Electronics, CATT, Vodafone and Huawei (3GPP TSG RAN Meeting #68 Malmo, Sweden, Jun. 15-18, 2015).
[2] LTE for UMTS: OFDMA and SC-FDMA Based Radio Access, Harris Holma and Antti Toskala, Wiley 2009, ISBN 978-0-470-99401-6.

The invention claimed is:

1. An infrastructure equipment for use with a wireless telecommunications system, the infrastructure equipment comprising:
a transceiver; and circuitry configured to:
a transmit signalling to a first terminal device identifying communication resources for use by the first terminal device in exchanging signalling with a second terminal device, wherein the communication resources identified by the signalling transmitted by the transceiver are selected from within one or more of a plurality of sets of communication resources, each set of communication resources being associated with a different respective range of possible speeds of the first terminal device as determined in accordance with a predetermined characteristic of the sets of communication resources, and wherein the communication resources of a particular set of communication resources are for use by the first terminal device in exchanging signalling with the second terminal device when the first terminal device is travelling at a speed which is within the range of possible speeds associated with that particular set of communication resources.

2. The infrastructure equipment according to claim 1, wherein the signalling transmitted to the first terminal device identifies the communication resources of each of the sets of communication resources.

3. The infrastructure equipment according to claim 1, wherein the circuitry is further configured to
receive signalling from the first terminal device indicative of the speed of the first terminal device,
determine communication resources for use by the first terminal device in exchanging signalling with the second terminal device, the identified communication resources being communication resources from the set of communication resources associated with the range of possible speeds of the first terminal device within which the indicated speed of the first terminal device is found, and
transmit signalling to the first terminal device indicative of the determined communication resources.

4. The infrastructure equipment according to claim 1, wherein the signalling transmitted to the first terminal devices identifies the communication resources of each of a portion of the sets of communication resources, each set in the portion of sets being associated with a different respective range of possible speeds of the first terminal device within a predetermined speed constraint, and wherein the circuitry is further configured to:
receive signalling from the first terminal device indicative of the speed of the first terminal device when the speed of the first terminal device is outside of the predetermined speed constraint,
in response to receiving the signalling from the first terminal device indicative of the speed of the first terminal device, newly determine communication resources for use by the first terminal device in exchanging signalling with the second terminal device, the newly determined communication resources being communication resources from the set of communication resources associated with the range of possible speeds of the first terminal device within which the determined speed of the first terminal device is found, and
transmit signalling to the first terminal device indicative of the newly determined communication resources.

5. The infrastructure equipment according to claim 4, wherein the predetermined speed constraint is that each possible speed of the first terminal device within the range of possible speeds associated with each set of communication resources in the portion of sets of communication resources is less than a predetermined speed.

6. The infrastructure equipment according to claim 4, wherein the predetermined speed constraint is that each possible speed of the first terminal device within the range of possible speeds associated with each set of communication resources in the portion of sets of communication resources is greater than a predetermined speed.

7. The infrastructure equipment according to claim 1, wherein the predetermined characteristic in accordance with which each set of communication resources is associated with a different respective range of possible speeds of the first terminal device is a cell coverage area over which each set of communication resources is utilised, wherein a set of communication resources utilised over a larger coverage area is associated with a higher range of possible speeds of the first terminal device and a set of communication resources utilised over a smaller coverage area is associated with a lower range of possible speeds of the first terminal device.

8. The infrastructure equipment according to claim 1, wherein the circuitry is further configured to transmit signalling to the first terminal device identifying further communication resources for use by the first terminal device in exchanging signalling with the second terminal device, wherein the further communication resources identified by the signalling transmitted by the transceiver are selected from within one or more further sets of communication resources, each further set of communication resources being associated with a different event priority level detectable by the first terminal device, the event priority level indicating a level of severity of an event detectable by the first terminal device, and wherein the communication resources of a particular further set of communication resources are for use by the first terminal device in exchanging signalling with the second terminal device when the first terminal device determines that an event has occurred and that the event priority level of the determined event is the event priority level associated with that particular further set of communication resources.

9. A method of operating an infrastructure equipment for use with a wireless telecommunications system, the method comprising:

transmitting signalling to a first terminal device, identifying communication resources for use by the first terminal device in exchanging signalling with a second terminal device, wherein the communication resources identified by the signalling transmitted by the transceiver are selected from within one or more of a plurality of sets of communication resources, each set of communication resources being associated with a different respective range of possible speeds of the first terminal device as determined in accordance with a predetermined characteristic of the sets of communication resources, and wherein the communication resources of a particular set of communication resources are for use by the first terminal device in exchanging signalling with the second terminal device when the first terminal device is travelling at a speed which is within the range of possible speeds associated with that particular set of communication resources.

10. The method of claim 9, wherein the signalling transmitted to the first terminal device identifies the communication resources of each of the sets of communication resources.

11. The method of claim 9, further comprising:

receiving signalling from the first terminal device indicative of the speed of the first terminal device;

determining communication resources for use by the first terminal device in exchanging signalling with the second terminal device, the identified communication resources being communication resources from the set of communication resources associated with the range of possible speeds of the first terminal device within which the indicated speed of the first terminal device is found; and transmitting signalling to the first terminal device indicative of the determined communication resources.

12. The method of claim 9, wherein the signalling transmitted to the first terminal devices identifies the communication resources of each of a portion of the sets of communication resources, each set in the portion of sets being associated with a different respective range of possible speeds of the first terminal device within a predetermined speed constraint, the method further comprising:

receiving signalling from the first terminal device indicative of the speed of the first terminal device when the speed of the first terminal device is outside of the predetermined speed constraint;

in response to receiving the signalling from the first terminal device indicative of the speed of the first terminal device, newly determining communication resources for use by the first terminal device in exchanging signalling with the second terminal device, the newly determined communication resources being communication resources from the set of communication resources associated with the range of possible speeds of the first terminal device within which the determined speed of the first terminal device is found; and transmitting signalling to the first terminal device indicative of the newly determined communication resources.

13. The method of claim 12, wherein the predetermined speed constraint is that each possible speed of the first terminal device within the range of possible speeds associated with each set of communication resources in the portion of sets of communication resources is less than a predetermined speed.

14. The method of claim 12, wherein the predetermined speed constraint is that each possible speed of the first terminal device within the range of possible speeds associated with each set of communication resources in the portion of sets of communication resources is greater than a predetermined speed.

15. The method of claim 9, wherein the predetermined characteristic in accordance with which each set of communication resources is associated with a different respective range of possible speeds of the first terminal device is a cell coverage area over which each set of communication resources is utilised, wherein a set of communication resources utilised over a larger coverage area is associated with a higher range of possible speeds of the first terminal device and a set of communication resources utilised over a smaller coverage area is associated with a lower range of possible speeds of the first terminal device.

16. The method of claim 9, further comprising:

transmitting signalling to the first terminal device identifying further communication resources for use by the first terminal device in exchanging signalling with the second terminal device, wherein the further communication resources identified by the signalling transmitted by the transceiver are selected from within one or more further sets of communication resources, each further set of communication resources being associated with a different event priority level detectable by the first terminal device, the event priority level indicating a level of severity of an event detectable by the first terminal device, and wherein the communication resources of a particular further set of communication resources are for use by the first terminal device in exchanging signalling with the second terminal device when the first terminal device determines that an event has occurred and that the event priority level of the determined event is the event priority level associated with that particular further set of communication resources.

17. An infrastructure equipment for use with a wireless telecommunications system, the infrastructure equipment comprising:

a transceiver circuitry; and a controller circuitry, wherein the controller circuitry is configured to control the transceiver circuitry to transmit signalling to a first terminal device identifying communication resources for use by the first terminal device in exchanging signalling with a second terminal device, wherein the communication resources identified by the signalling transmitted by the transceiver circuitry are selected by the controller circuitry from within one or more of a plurality of sets of communication resources, each set of communication resources being associated with a different respective range of possible speeds of the first terminal device as determined in accordance with a predetermined characteristic of the sets of communication resources, and wherein the communication resources of a particular set of communication resources are for use by the first terminal device in exchanging signalling with the second terminal device when the first terminal device is travelling at a speed which is within the range of possible speeds associated with that particular set of communication resources.

* * * * *